United States Patent
Su et al.

(10) Patent No.: US 10,464,572 B1
(45) Date of Patent: Nov. 5, 2019

(54) SAFETY DEVICE FOR MOTOR VEHICLE

(71) Applicant: CHAO LONG MOTOR PARTS CORP., Taoyuan (TW)

(72) Inventors: Chao-Hsi Su, Taoyuan (TW);
Yung-Min Chen, Taoyuan (TW);
Kuo-Chueh Chen, Taoyuan (TW);
Cheng-Wei Lin, Taoyuan (TW)

(73) Assignee: CHAO LONG MOTOR PARTS CORP., Taoyuan (TW)

( * ) Notice: Subject to any disclaimer, the term of this patent is extended or adjusted under 35 U.S.C. 154(b) by 0 days.

(21) Appl. No.: 16/004,255

(22) Filed: Jun. 8, 2018

(51) Int. Cl.
*B60W 40/00* (2006.01)
*B60W 10/00* (2006.01)
*B60W 40/08* (2012.01)
*B60W 10/06* (2006.01)
*B60W 10/18* (2012.01)

(52) U.S. Cl.
CPC ............ *B60W 40/08* (2013.01); *B60W 10/06* (2013.01); *B60W 10/18* (2013.01); *B60W 2420/40* (2013.01); *B60W 2420/54* (2013.01); *B60W 2520/16* (2013.01); *B60W 2710/06* (2013.01); *B60W 2710/18* (2013.01); *B60Y 2200/225* (2013.01)

(58) Field of Classification Search
CPC .. B60W 40/08; B60W 10/18; B60Y 2200/225
See application file for complete search history.

(56) References Cited

U.S. PATENT DOCUMENTS

| | | | | |
|---|---|---|---|---|
| 4,717,207 A * | 1/1988 | Kubota | .................. | B60T 7/122 |
| | | | | 180/282 |
| 7,266,441 B2 * | 9/2007 | Shim | ..................... | B60W 10/06 |
| | | | | 701/112 |
| 8,725,353 B2 * | 5/2014 | Lu | ......................... | B60W 10/06 |
| | | | | 701/41 |
| 2008/0201044 A1 * | 8/2008 | Yamada | ................. | B60K 28/04 |
| | | | | 701/50 |
| 2011/0184615 A1 * | 7/2011 | Marcus | ................... | B60L 50/16 |
| | | | | 701/58 |
| 2013/0041577 A1 * | 2/2013 | Puhalla | ................. | B60W 40/11 |
| | | | | 701/124 |

* cited by examiner

*Primary Examiner* — Kira Nguyen

(57) ABSTRACT

A safety device for motor vehicle includes a microprocessor having set therein a tilt angle default value, a controller coupled with the ignition device and brake device of the motor vehicle, an angle sensor mounted to the body of the motor vehicle and an operator sensor installed in the directional control device. The microprocessor activates the controller to turn off the ignition device and to actuate the brake device if the motor vehicle is tilted excessively or when the operator goes out of the sensing range of the operator sensor, avoiding danger.

4 Claims, 4 Drawing Sheets

SAFETY DEVICE FOR MOTOR VEHICLE

BACKGROUND OF THE INVENTION

1. Field of the Invention

The present invention relates to motor vehicle safety technology and more particularly to a safety device for used in a motor vehicle, which stops the motor vehicle from movement before dumping occurs or when the operator goes out of the sensing range, avoiding danger.

2. Description of the Related Art

During movement of a motor vehicle such as ATV (All Terrain Vehicle), lawn mower, car, motorcycle, etc., a danger of dumping of the motor vehicle can occur due to changes in the terrain or an improper operation of the user. Further, if the operator (user) accidentally leaves the operating range as the motor vehicle is traveling, for example, if the body of the operator (user) is shaken or tilted violently, or the hand of the operator (user) is out of the directional control device, a danger can occur.

SUMMARY OF THE INVENTION

The present invention has been accomplished under the circumstances in view. It is therefore the main object of the present invention to provide a safety device for motor vehicle, which stops the motor vehicle from movement before dumping occurs or when the operator goes out of the sensing range, avoiding danger.

To achieve this and other objects of the present invention, a safety device is used in a motor vehicle, comprising a microprocessor, a controller, an angle sensor and an operator sensor means. The controller, the angle sensor and the operator sensor means are respectively electrically connected to the microprocessor. The microprocessor has set therein a tilt angle default value. The controller is connected with the ignition device and brake device of the motor vehicle. The angle sensor is mounted to the body of the motor vehicle. The operator sensor means is connected to the directional control device of the motor vehicle.

If the user goes beyond the sensing range of the operator sensor means, the operator sensor means provides a signal to the microprocessor. Upon receipt of the signal from the operator sensor means, the microprocessor activates the controller to turn off the ignition device and to actuate the brake device.

Further, the angle sensor detects the angle of the body of the motor vehicle and transmits the detected angle signal to the microprocessor for comparison with the tilt angle default value so that the microprocessor activates the controller to turn off the ignition device and to actuate the brake device if the value of the detected angle signal is greater than the tilt angle default value.

Further, the operator sensor means of the safety device can be a contact sensor, a photoelectric sensor, or an ultrasonic sensor.

DETAILED DESCRIPTION OF THE PREFERRED EMBODIMENT

Figure 1:
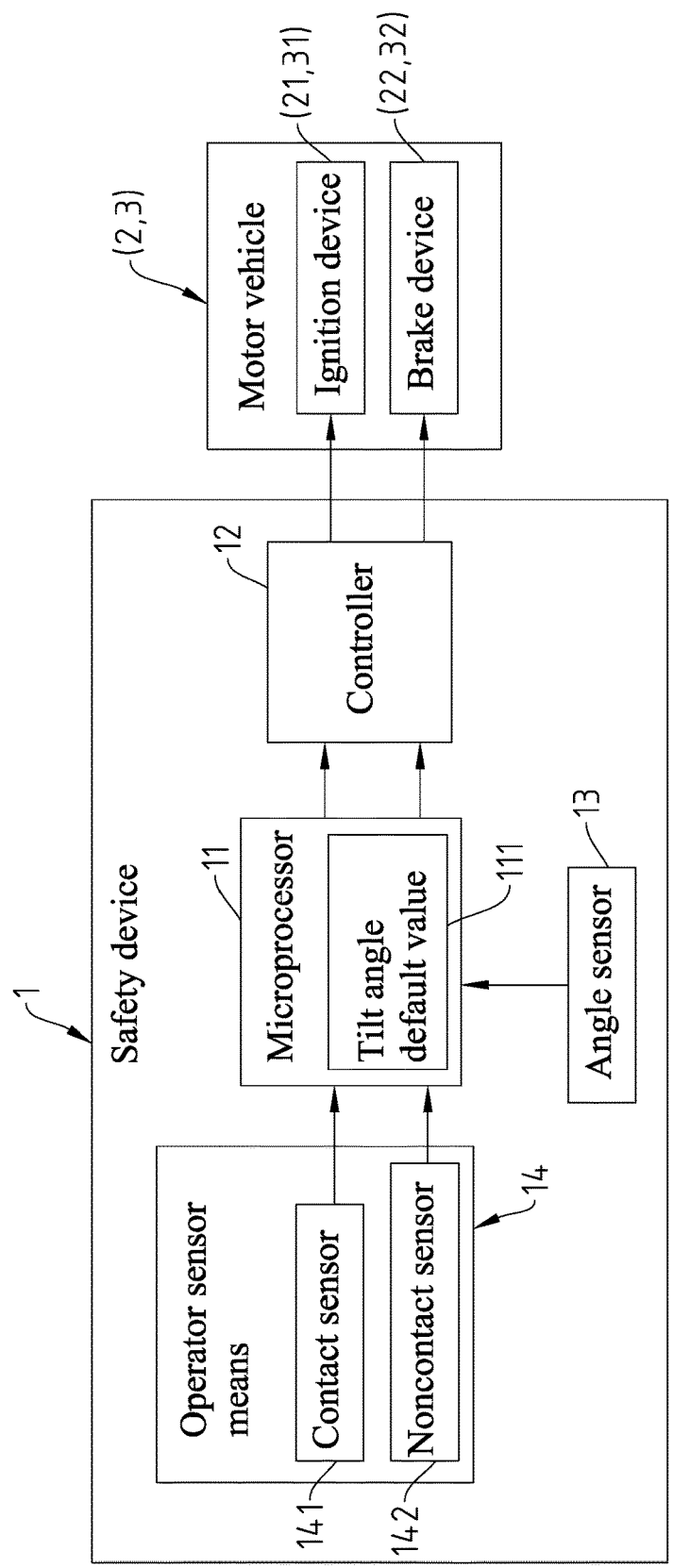
FIG. 1 is a circuit block diagram of a safety device for motor vehicle in accordance with the present invention.

Referring to FIG. 1, a safety device 1 for motor vehicle in accordance with the present invention comprises a microprocessor 11, and a controller 12, an angle sensor 13 and am operator sensor means 14 respectively electrically connected to the microprocessor 11. The microprocessor 11 has set therein a tilt angle default value 111. The operator sensor means 14 includes a contact sensor 141 and a noncontact sensor 142. The noncontact sensor 142 can be a photoelectric sensor or ultrasonic sensor.

Figure 2:
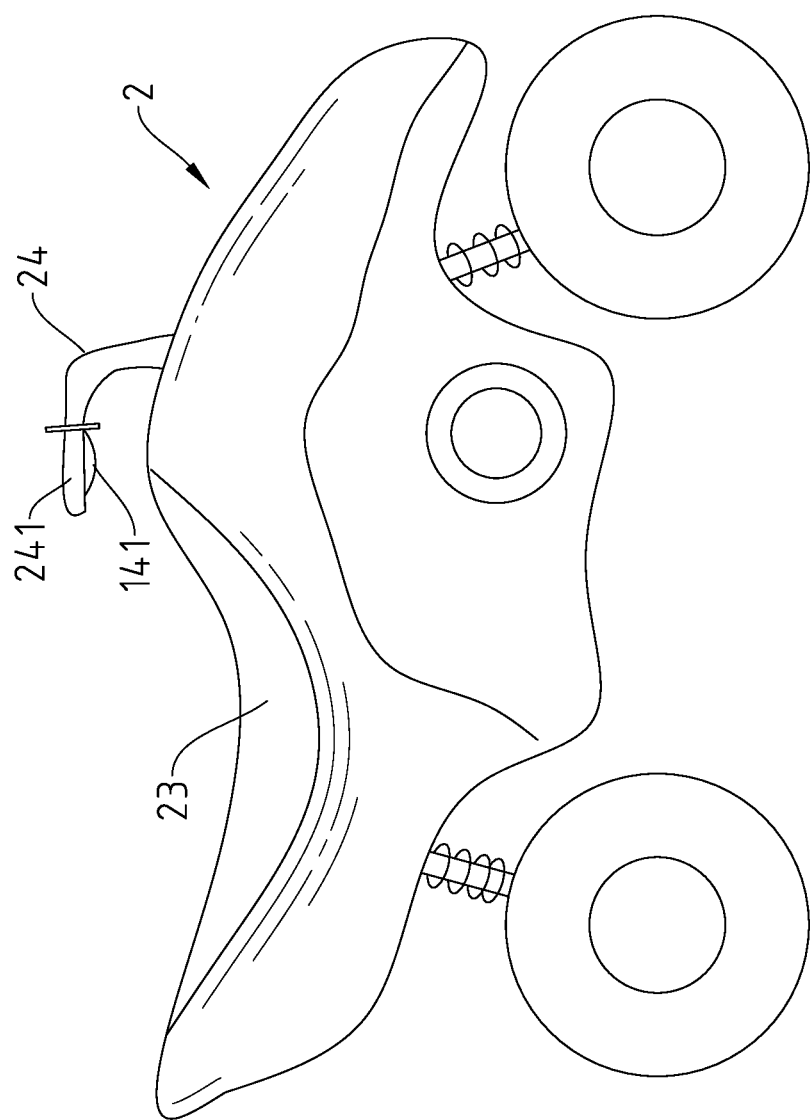
FIG. 2 is a schematic side view illustrating the safety device used in an ATV (All Terrain Vehicle).
Figure 3:
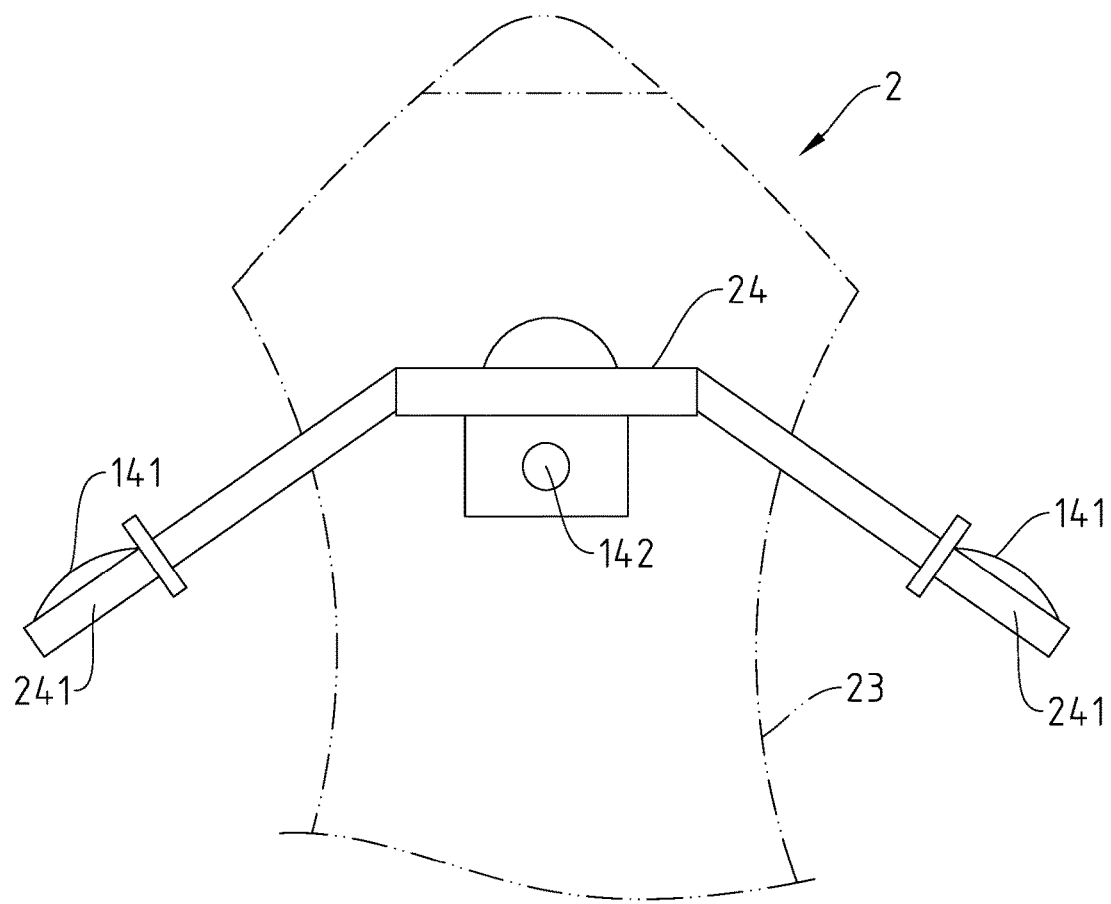
FIG. 3 is a schematic top view of a part of FIG. 2.

Referring to FIGS. 2 and 3 and FIG. 1 again, the safety device 1 can be installed in an ATV (All Terrain Vehicle) 2. In installation, the controller 12 is connected with the ignition device 21 and brake device 22 of the ATV (All Terrain Vehicle) 2, the angle sensor 13 is mounted to the body 23 of the ATV (All Terrain Vehicle) 2, and the operator sensor means 14 is connected with the directional control device 24. In this embodiment, the operator sensor means 14 is a combination of a contact sensor 141 and a noncontact sensor 142, wherein the contact sensor 141 is installed in each of two grips 241 of the directional control device 24; the noncontact sensor 142 that can be a photoelectric sensor or ultrasonic sensor is installed in the directional control device 24 between the two grips 241, 丑 noncontact sensor 142.

If the user (driver) of the ATV (All Terrain Vehicle) 2 goes beyond the sensing range of the operator sensor means 14, the contact sensor 141 or noncontact sensor 142 will provide a signal to the microprocessor 11. For example, if the hands of the user (driver) leave from the grips 241 of the directional control device 24, the contact sensor 141 will provide a signal to the microprocessor 11; if the body of the user (driver) leaves from the driver's seat of the ATV (All Terrain Vehicle) 2, the noncontact sensor 142 will provide a signal to the microprocessor 11. Upon receipt of the signal from the contact sensor 141 or the noncontact sensor 142, the microprocessor 11 immediately activates the controller 12 to turn off the ignition device 21 and to actuate the brake device 22, thereby stopping the ATV (All Terrain Vehicle) 2 from movement to avoid danger.

Further, the angle sensor 13 detects the angle of the body 23 of the ATV (All Terrain Vehicle) 2 at any time and transmits the detected angle signal to the microprocessor 11 for comparison with the tilt angle default value 111. If the value of the detected angle signal is greater than the tilt angle default value 111, the microprocessor 11 immediately activates the controller 12 to turn off the ignition device 21 and to actuate the brake device 22, preventing the dumping of the ATV (All Terrain Vehicle) 2.

Figure 4:
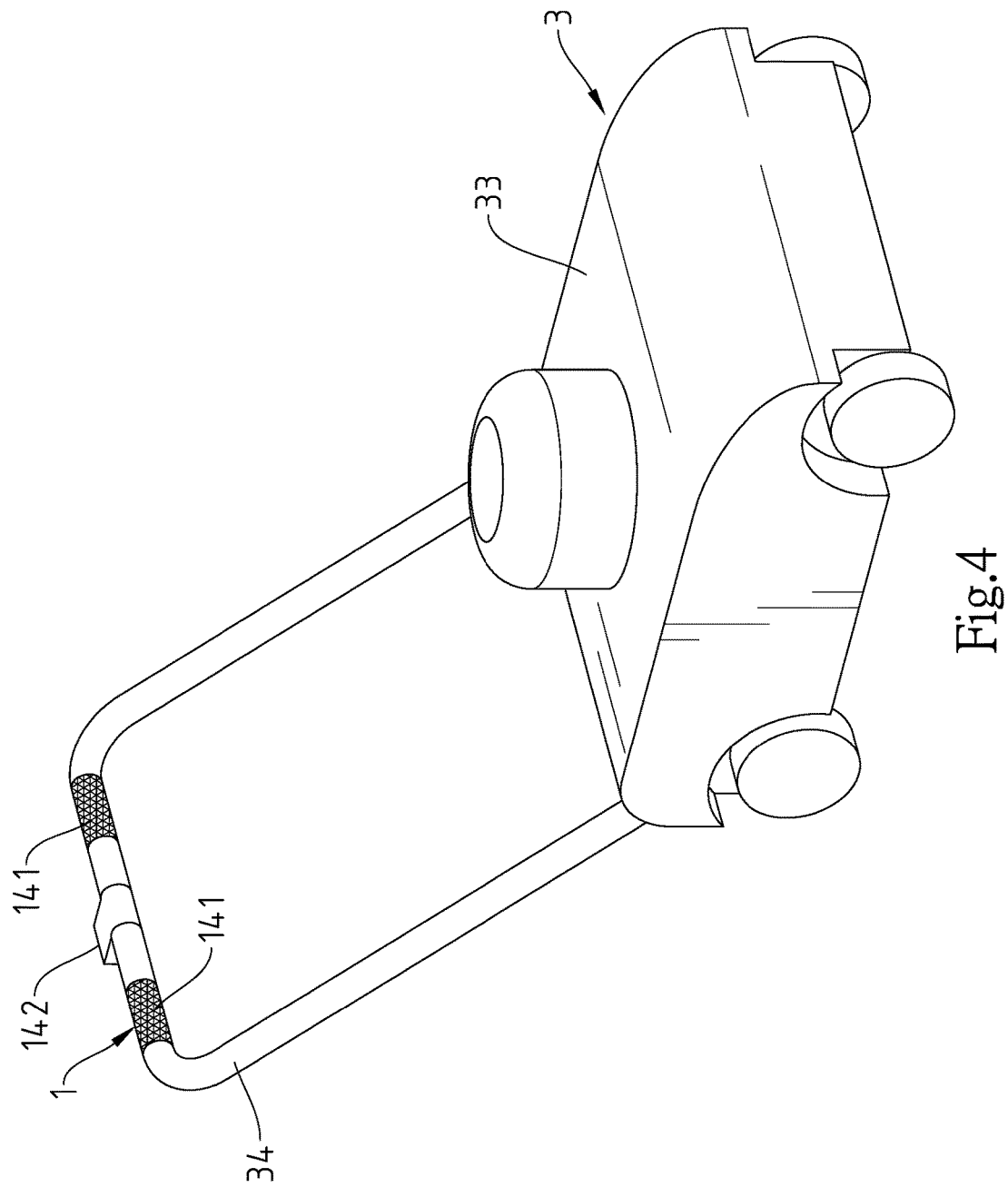
FIG. 4 is a schematic drawing illustrating the safety device used in a lawn mower.

Referring to FIG. 4 and FIG. 1 again, in another application example, the safety device 1 is installed in a lawn mower 3. In installation, the controller 12 is connected with the ignition device 31 and brake device 32 of the lawn mower 3, the angle sensor 13 is mounted to the body (housing) 33 of the lawn mower 3, and the operator sensor means 14 is installed in the directional control device (handle) 34 of the lawn mower 3. If the hands of the user leave from the directional control device (handle) 34 of the lawn mower 3, the contact sensor 141 will provide a signal to the microprocessor 11. If the body of the user goes beyond the sensing range of the noncontact sensor 142, the noncontact sensor 142 will provide a signal to the microprocessor 11. Upon receipt of the signal from the contact sensor 141 or the noncontact sensor 142, the microprocessor 11 immediately activates the controller 12 to turn off the ignition device 31 and to actuates the brake device 32, stopping the lawn mower 3 from movement to avoid danger.

What the invention claimed is:

1. A safety device installed in a motor vehicle comprising a body, an ignition device, a brake device and a directional control device, the safety device comprising a microprocessor, a controller connected with said ignition device and said brake device of said motor vehicle, an angle sensor mounted to said body of said motor vehicle and an operator sensor means connected to said directional control device of said motor vehicle, said controller, said angle sensor and said operator sensor means being respectively electrically connected to said microprocessor, said microprocessor having set therein a tilt angle default value, wherein when the user goes beyond the sensing range of said operator sensor means, said operator sensor means provides a signal to said microprocessor; upon receipt of the signal from said operator sensor means, said microprocessor activates said controller to turn off said ignition device and to actuate said brake device; said angle sensor detects the angle of said body of said motor vehicle and transmits the detected angle signal to said microprocessor for comparison with said tilt angle default value so that said microprocessor activates said controller to turn off said ignition device and to actuate said brake device if the value of said detected angle signal is greater than said tilt angle default value.

2. The safety device as claimed in claim 1, wherein said operator sensor means is a contact sensor.

3. The safety device as claimed in claim 1, wherein said operator sensor means is a photoelectric sensor.

4. The safety device as claimed in claim 1, wherein said operator sensor means is an ultrasonic sensor.

* * * * *